(12) United States Patent
Bäckström et al.

(10) Patent No.: US 11,719,373 B2
(45) Date of Patent: Aug. 8, 2023

(54) COUPLING WITH PRESSURE RELIEF

(71) Applicant: MANN TEKNIK AB, Mariestad (SE)

(72) Inventors: Marcus Bäckström, Mariestad (SE); Fredrik Adamsson, Mariestad (SE)

(73) Assignee: MANN TEKNIK AB, Mariestad (SE)

( * ) Notice: Subject to any disclaimer, the term of this patent is extended or adjusted under 35 U.S.C. 154(b) by 0 days.

(21) Appl. No.: 16/756,737

(22) PCT Filed: Oct. 26, 2018

(86) PCT No.: PCT/SE2018/051096
§ 371 (c)(1),
(2) Date: Apr. 16, 2020

(87) PCT Pub. No.: WO2019/093941
PCT Pub. Date: May 16, 2019

(65) Prior Publication Data
US 2021/0190250 A1 Jun. 24, 2021

(30) Foreign Application Priority Data
Nov. 8, 2017 (SE) .................................... 1751380-5

(51) Int. Cl.
*F16L 55/10* (2006.01)
*F16L 29/04* (2006.01)
(Continued)

(52) U.S. Cl.
CPC ............ *F16L 55/1015* (2013.01); *F16L 29/04* (2013.01); *F16K 17/0466* (2013.01);
(Continued)

(58) Field of Classification Search
CPC ....... F16L 29/02; F16L 29/04; F16L 55/1015; F16L 37/32; F16L 2201/20;
(Continued)

(56) References Cited

U.S. PATENT DOCUMENTS 3,818,939 A 6/1974 Buseth
4,392,513 A 7/1983 Parrish
(Continued)

FOREIGN PATENT DOCUMENTS

CN 106939950 A 7/2017
CN 107246521 A 10/2017
(Continued)

OTHER PUBLICATIONS

Machine translation for CN 106939950A, retrieved from Espacenet. com on Sep. 19, 2022 [taken from www.esapcenet.com] (Year: 2022).*
(Continued)

*Primary Examiner* — Craig J Price
(74) *Attorney, Agent, or Firm* — Birch, Stewart, Kolasch & Birch, LLP

(57) ABSTRACT

A coupling for a break-away valve assembly includes a coupling and an adapter, the coupling including: a valve arranged in an annular body, the annular body having a valve seat including a first portion and a second portion, adjacent to the first portion, of greater internal diameter relative to the first portion, the valve being biased in a first direction to seal against the valve seat on disconnection of the coupling from the adapter, wherein the valve is biased in a second direction, and the valve is adapted to extend past the first portion into the second portion of the valve seat to release a volume of fluid if the pressure acting on the valve exceeds a predetermined surge pressure threshold.

20 Claims, 5 Drawing Sheets

(51) Int. Cl.
*F16K 17/04* (2006.01)
*F16L 37/32* (2006.01)

(52) U.S. Cl.
CPC ......... *F16K 2200/302* (2021.08); *F16L 37/32* (2013.01); *F16L 55/1007* (2013.01); *F16L 2201/20* (2013.01); *Y10T 137/1654* (2015.04); *Y10T 137/1662* (2015.04)

(58) Field of Classification Search
CPC .............. F16L 55/1007; F16K 17/0466; F16K 2201/20; F16K 2200/302; F16K 17/044; Y10T 137/1654; Y10T 137/1662; Y10T 137/7771–778; Y10T 137/87917–87973; Y10T 137/8811; Y10T 137/9029; Y10T 137/9138; F17C 5/007; F17C 2250/072–077; F17C 2205/037; F17C 2205/0373; F17C 2205/0332; F17C 2205/0335
USPC ..... 137/68.14, 68.15, 613–614.06, 797–799, 137/493–493.9; 251/149–149.9
See application file for complete search history.

(56) References Cited

U.S. PATENT DOCUMENTS

| | | | |
|---|---|---|---|
| 4,614,201 A | 9/1986 | King et al. | |
| 4,921,000 A | 5/1990 | King et al. | |
| 5,215,122 A | 6/1993 | Regers et al. | |
| 5,398,723 A * | 3/1995 | Allread | F16L 37/34 137/614.03 |
| 6,056,010 A * | 5/2000 | Wells | F16L 37/34 137/614 |
| 9,140,393 B2 * | 9/2015 | Wolff | F16L 37/004 |
| 9,310,000 B2 | 4/2016 | Liang | |
| 9,310,003 B2 | 4/2016 | Blanchard et al. | |
| 9,322,498 B2 * | 4/2016 | Wolff | B67D 7/3218 |
| 2005/0001194 A1 | 1/2005 | Bachelder | |
| 2015/0167882 A1 | 6/2015 | Von Keitz | |

FOREIGN PATENT DOCUMENTS

| | | |
|---|---|---|
| CN | 107300079 A | 10/2017 |
| CN | 206600550 U | 10/2017 |
| CN | 206600551 U | 10/2017 |
| EP | 2 781 818 A1 | 9/2014 |
| JP | 2016-89918 A | 5/2016 |
| WO | WO 97/29318 A1 | 8/1997 |

OTHER PUBLICATIONS

International Search Report, issued in PCT/SE2018/051096, dated Jan. 7, 2019.
Written Opinion of the International Searching Authority, issued in PCT/SE2018/051096, dated Jan. 7, 2019.

* cited by examiner

COUPLING WITH PRESSURE RELIEF

FIELD OF THE INVENTION

The present disclosure relates to coupling for break-away valve assemblies. In particular it relates to couplings for break-away valve assemblies comprising a valve biased in a first direction and a second direction.

BACKGROUND OF THE INVENTION

Fluid transfer systems are used to transfer a fluid from a source to a destination. Dry disconnect or break-away coupling assemblies are used in fluid transfer systems to provide dry couplings and break-away couplings. Break-away coupling assemblies generally comprise a first and second coupling half, herein described as a coupling and an adapter. A break-away coupling is adapted to facilitate a controlled breaking point between the coupling and adapter if the fluid transfer system is exerted to a force that otherwise would risk the fluid integrity of the fluid transfer system.

To form a fluid conduit the coupling and the adapter are connected together. The connection of the coupling to the adapter actuates valves in the coupling and the adapter which open and allow fluid flow through the assembly.

On break-away of the coupling from the adapter the valves are closed automatically. For dry disconnect couplings the valves can be closed either automatically or via actuation means present on either the coupling or the adapter or both. This closure of valves in both the coupling and the adapter leads to the closure of the fluid path and thus fluid cannot leak from the coupling or the adapter during the break-away.

However, such systems are prone to surge pressures. The sudden reduction in fluid volume of the system leads to an increase in pressure. This pressure can damage pumps, valves or other systems in connection with the fluid system.

Pressure relief valves such as that shown in U.S. Pat. No. 9,310,000 B2 are known in the field of break-away assemblies. However, such pressure relief valves require additional bores in the body of the coupling which add to the complexity of the coupling, and may furthermore release fluid directly towards the radial outside of the coupling, that is, towards a user.

U.S. Pat. No. 3,818,939 discloses a self-sealing coupling comprising a two-part valve assembly where an additional and separate relief valve is provided for the release of fluid.

Improved and simpler systems are thus desirable.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a coupling for a break-away valve assembly comprising a coupling and an adapter, said coupling comprising: a valve arranged in an annular body, the annular body having a valve seat comprising a first portion and a second portion, adjacent to the first portion, of greater internal diameter relative to the first portion, the valve being biased in a first direction to seal against the valve seat on disconnection of the coupling from the adapter, characterised in that the valve is biased in a second direction, and in that the valve is adapted to extend past the first portion into the second portion of the valve seat to release a volume of fluid if the pressure acting on the valve exceeds a predetermined surge pressure threshold.

A method for relieving surge pressure in a coupling is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

The leakage of a small volume of fluid has traditionally been avoided in for example break-away and dry disconnect systems. Break-away couplings could as described herein could for example be so called breaking pin couplings, cable release couplings, or PERC (powered emergency release coupling). The present inventors have, however, identified that a small volume of controlled leakage is acceptable when it means that other elements of a fluid transfer system such as pumps and other valves are not damaged. At disconnection of for example a break-away coupling the coupling 2 is released from the adapter 3 closing the path for the liquid. This sudden restriction stopping the flow momentarily creates a rapidly increasing pressure at the valve in the coupling 2.

Figure 1:
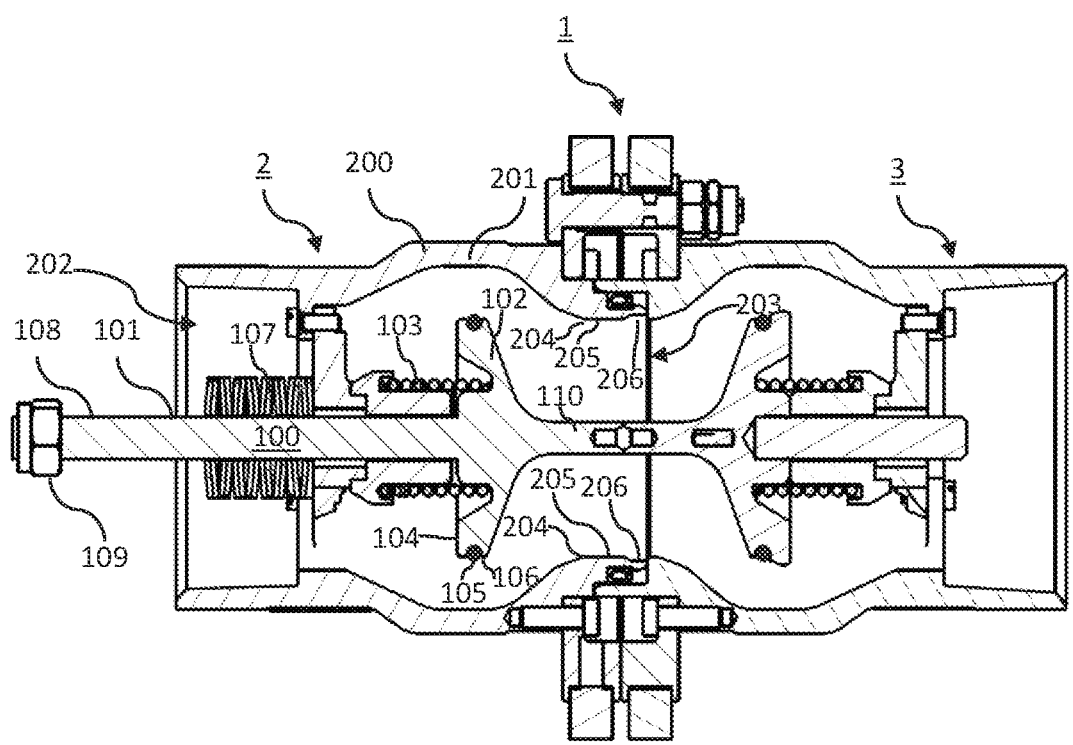
FIG. 1 is cross sectional perspective view of a valve assembly with a coupling according to an aspect.

FIG. 1 shows a valve assembly 1 comprising a coupling 2 and an adapter 3. During operation, the valve assembly 1 forms a fluid conduit for the transfer of fluids. The valve assembly 1 may be a dry disconnect, or break-away, type assembly. On connection of the coupling 2 to the adapter 3 a fluid flow path is defined through the coupling 2 and the adapter 3. Generally fluid flows from the coupling 2 to the adapter 3, that is, the direction of fluid flow is generally left to right in FIG. 1. A pump (not shown) may be provided in fluidic connection with the coupling 2 and/or the adapter 3.

Figure 2:
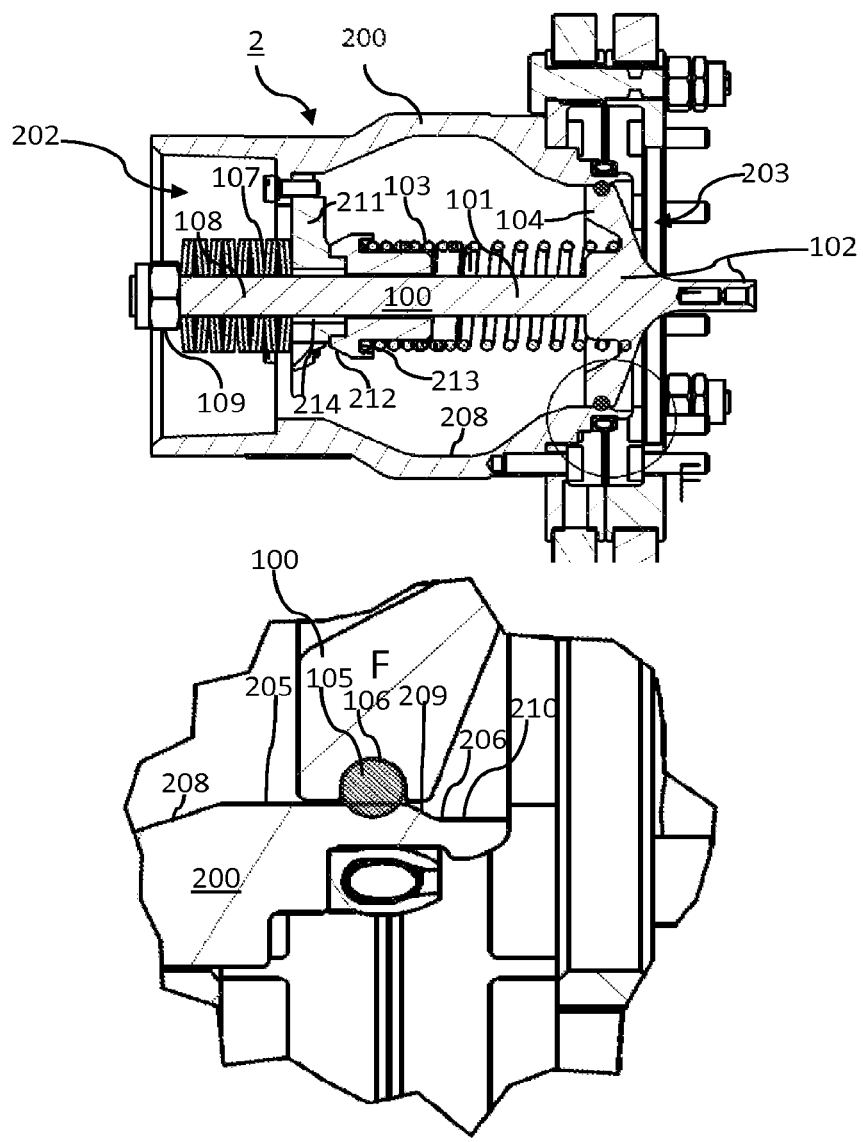
FIG. 2 is a cross sectional perspective view of a coupling, having a closed valve, according to an aspect where the valve and valve seat are shown in detail.
Figure 3:
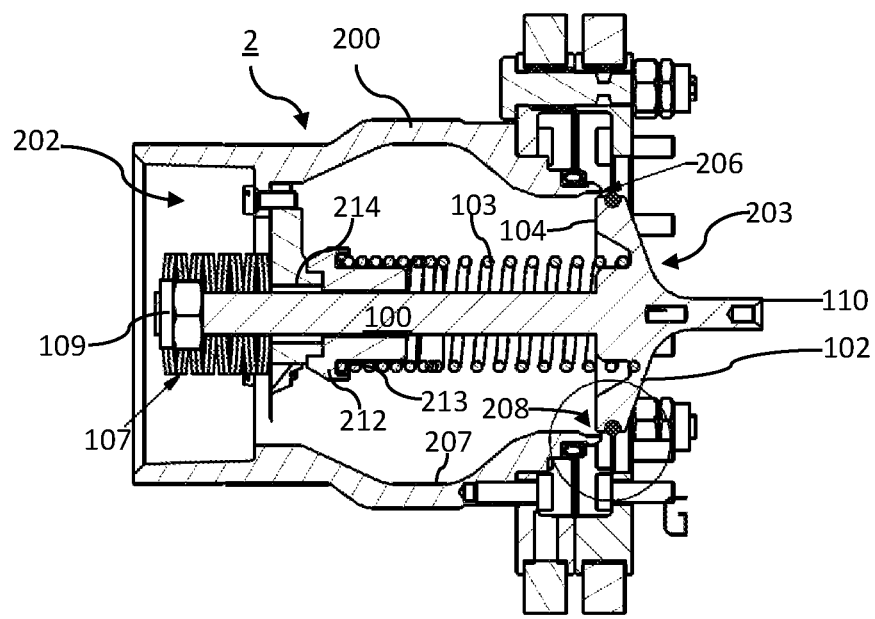
FIG. 3 is a cross-sectional perspective view of a coupling, having a valve where a volume of fluid can pass the valve, where the valve and valve seat are shown in detail.
Figure 3:
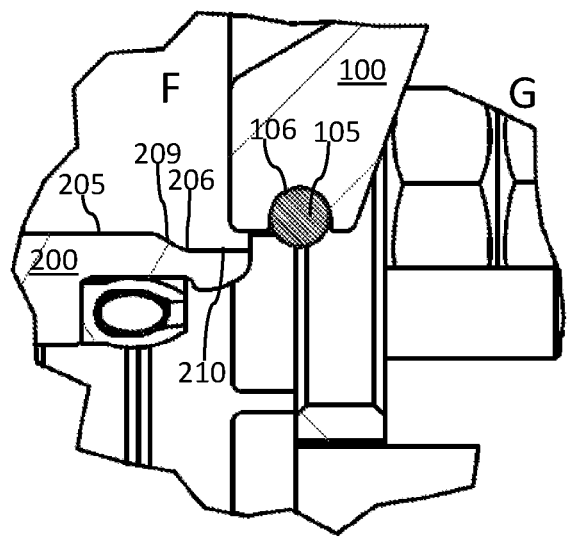
Figure 4:
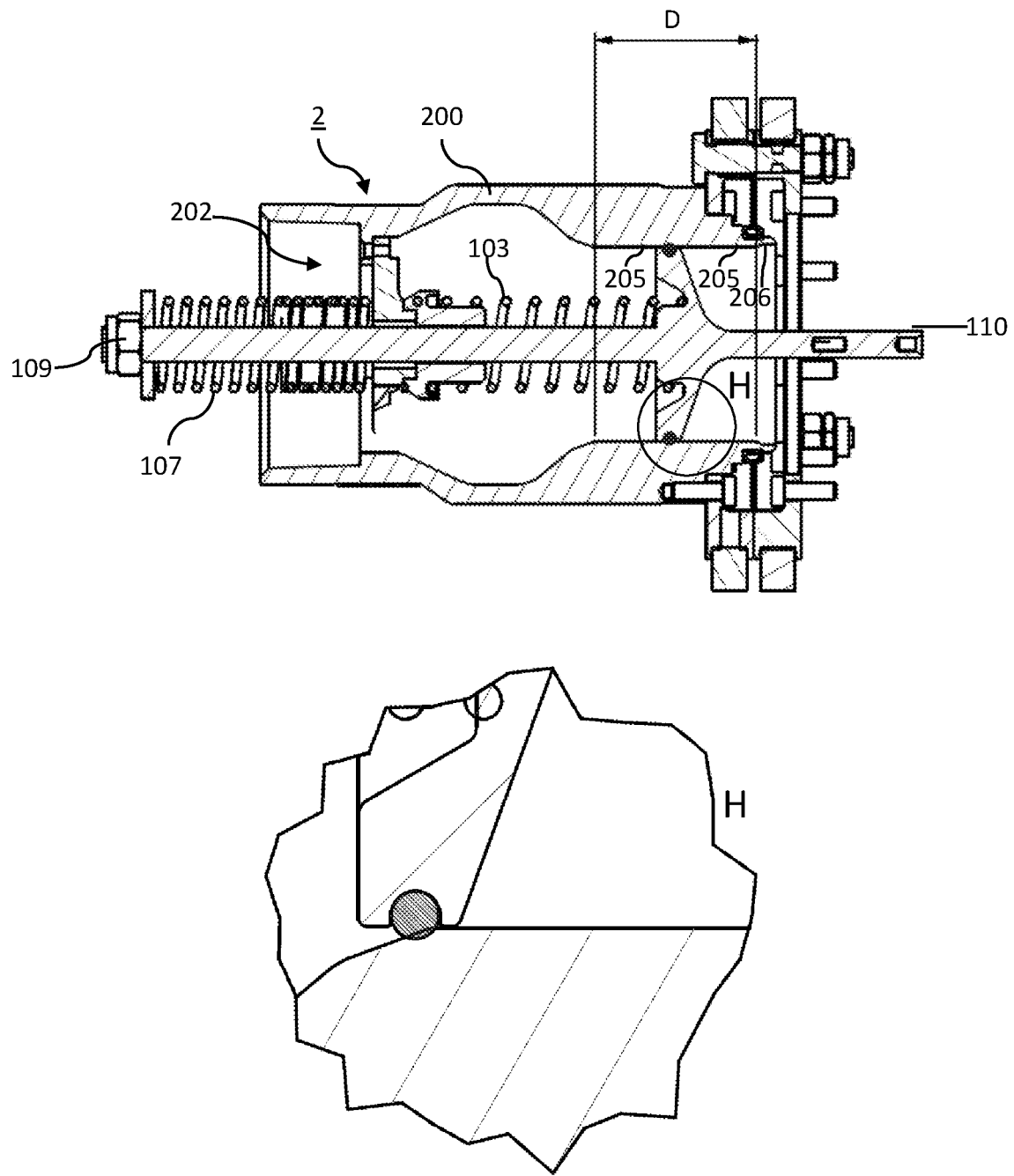
FIG. 4 illustrates a cross sectional perspective view of a coupling, having a closed valve according to an aspect.
Figure 5:
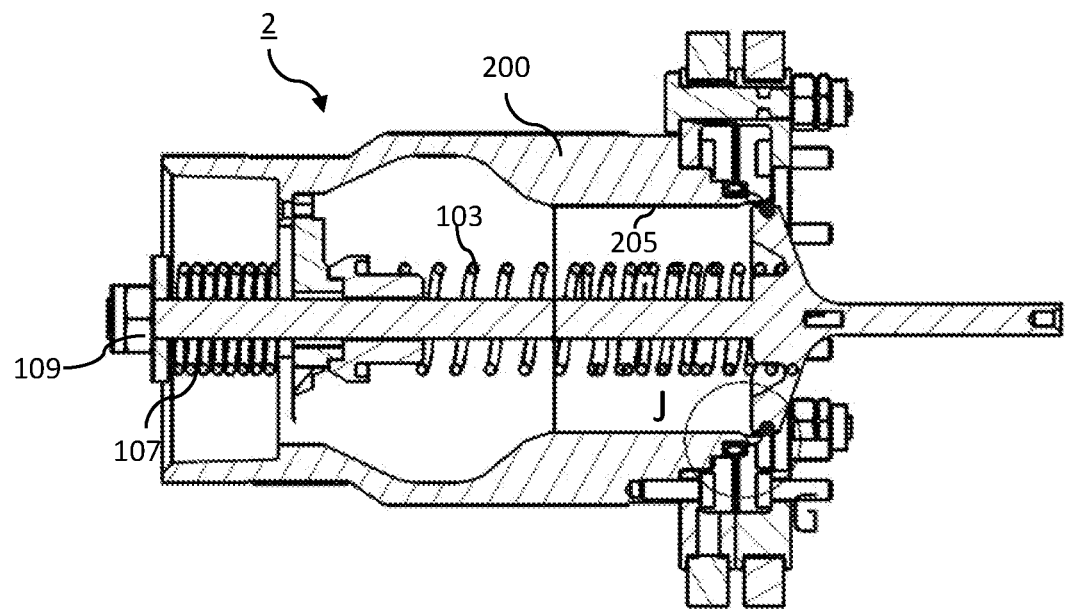
FIG. 5 illustrates a cross sectional perspective having a valve wherein a volume of fluid can pass the valve.
Figure 5:
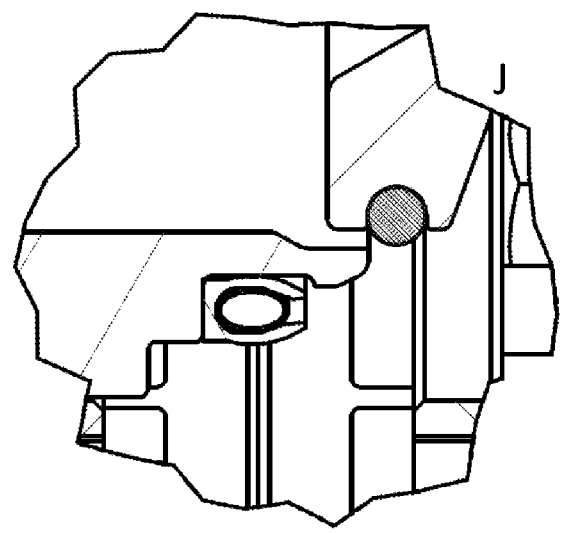

As shown in FIGS. 1 to 3, the coupling 2 comprises a valve 100 arranged within a body 200. The body 200 is generally cylindrical, having an internal bore or cavity within an annular wall 201 defining a fluid path. The longitudinal axis of the body is aligned with the direction of fluid flow through the body 200. The coupling 2 has a tube end 202 and an adapter end 203. The tube end 202 of the coupling 2 is generally provided in connection with a tube or other fluid conduit (not shown). The adapter end 203 is adapted to engage with the adapter 3 of the valve assembly 1.

The body 200 is provided with a valve seat 204. The valve seat 204 is provided on the annular wall 201 in the internal bore of the body. The valve seat 204 comprises a first portion 205 having a diameter adapted to seal against the perimeter of the valve 100. The valve seat 204 comprises a second portion 206, adjacent to the first portion 205. The second portion 206 may have an internal diameter which is greater than the internal diameter of the first portion 205. That is, the second portion 206 may have a slightly larger bore with respect to the first portion 205. The second portion 206 may be proximal to the adapter end 203 of the coupling. The first portion 205 may be distal to the adapter end 203 of the coupling 2. The valve seat 204 is fixed with respect to the body.

The valve 100 is a main flow valve, that is, it is a valve which controls the main flow of fluid through the coupling 2. The coupling 2 does not comprise a separate relief valve. If the valve 100 is closed, no fluid may flow through the coupling 2. The valve 100 may be a valve 100 comprising a valve stem 101 and a valve head 102. The valve head 102 may be disc formed. The perimeter of the valve head 102 may seal against the valve seat 204. The valve stem 101 may be aligned with the centre of the valve head 102. The valve head 102 and the valve stem 101 may be integral, that is, they may be formed from a single piece of material. The form of the valve 100 may be considered a poppet valve. The valve 100 is biased in a first direction (to the right in FIG. 1) such that the valve head 102 of the valve 100 seals against the first portion 205 of the valve seat 204. The biasing may be achieved by a first biasing means 103 such as a spring. The first biasing means 103 may be a valve closing spring. The first biasing means 103 acts on the rear 104 of the head of the valve. The first biasing means 103 may act continuously on the valve 100. The first biasing means 103 may be arranged around the stem 101 of the valve 100. The first biasing means 103 may urge the valve 100 towards the adapter end 203 of the coupling 2.

The sealing of the valve head 102 to the valve seat 204 may be improved by an annular gasket or O-ring 105 provided in the perimeter of the valve head 102 sealing against the first portion 205 of the valve seat 204. The valve head 102 may comprise an annular groove 106 adapted to receive the annular gasket or O-ring 105.

During fluid transfer operation, to enable continuous flow of a fluid through the coupling 2, the valve 100 is unseated from the first portion 205 of the valve seat 204. The valve 100 may be displaced longitudinally within the body 200, against the biasing in the first direction, such that the valve 100 is displaced to a large-bore region 207 of the body 200 having an internal diameter substantially greater than the diameter than the diameter of the valve 100. This opens the valve 100 such that fluid can flow past the valve 100 and through the coupling 2.

As opposed to previous break-away valves, the valve 100 may be biased in a second direction. The biasing is achieved by a second biasing means 107, such as a spring. The second biasing means 107 may be arranged around the stem 101 of the valve 100. The second direction is generally opposite to the first direction (to the left in FIG. 1). The second biasing means 107 may urge the valve 100 to the tube end of the coupling. During fluid transfer operation and continuous flow of fluid through the coupling, the biasing means does not necessarily act on the valve. The second biasing means 107, does therefore not necessarily act continuously on the valve 100. This can be seen in FIG. 1 where the rear 108 of the valve stem 101 is not engaged with the second biasing means 107.

On removing the adapter 3 from the coupling 2 the valve 100 is displaced towards the adapter end 203 of the coupling 2. The displacement is actuated by the first biasing means 103. The valve 100 engages with the valve seat 204 and seals the valve 100 such that fluid cannot flow from the coupling 2. As described above, in some instances this sudden sealing of the valve 100 may create a high pressure, or surge pressure, which acts on the rear 104 of the valve 100.

If the pressure acting on the valve 100 exceeds a predetermined surge pressure threshold the valve 100 is adapted to extend past the first portion 205 into the second portion 206 of the valve seat 204 to release a volume of fluid. During incidents of surge pressure acting on the valve 100 the valve 100 may extend longitudinally past the first portion of the valve seat 204 to the second portion 206. The force of the surge pressure is opposed by the biasing in the second direction by the second biasing means 107. As the second portion 206 has an internal diameter greater than the diameter of the valve 100 a volume of fluid will flow past the valve 100 out of the coupling 2. The reduction in fluid volume in the coupling 2, and optionally, the fluid conduits in connection with the coupling 2, reduces the surge pressure in the coupling 2. The biasing in the second direction subsequently reseats the valve 100 on the first portion 205 of the valve seat 204.

The volume of fluid which may flow past the valve 100, out of the coupling 2, flows in to the region 208 of the coupling 2 where fluid normally passes and is normally in contact with during operation. Small residual volumes of fluid may be present on this region 208 of the coupling 2 after disconnection. As the leaked volume of fluid is present in this region 208 of the coupling 2 where fluid residues may be anyway after disconnection there is limited risk to a user. This is, in comparison to systems with separate pressure relief valves, where the fluid may exit the coupling from a bore provided in the body of the coupling, and thus potentially in to the path of a user.

As, during a surge pressure incident, fluid can pass between the valve 100 and the second portion 206 around the circumference of the valve 100 a pressure release can occur rapidly. Even a relatively large volume of fluid can pass the valve 100 in a very short time, rapidly decreasing pressure in the system.

The flow of fluid during normal operating conditions, that is when the coupling 2 is connected to an adapter 3, and during a surge incident, occurs via the space between the internal wall of the body 200 and the valve 100.

The second biasing means 107 is generally adapted to engage the valve 100 when the valve head 102 reaches the first portion 205 of the valve seat 204. The rear portion 108 of the valve stem 101 may be provided with a flange 109 for engaging with the second biasing means 107. The flange may be, as is shown in FIGS. 1-3, a bolt attached to the rear 108 of the stem. The spring constant of the second biasing means 107, the force with which it opposes pressure on the rear 104 of the valve head 102, is selected such that it corresponds to the force of any expected surge pressure in the system. The force of the fluid acting on the rear 104 of the valve head 102 is opposed by the second biasing means 107. The spring constant is also selected such that at pressures lower than the working pressure the second biasing means 107 is not actuated.

The second biasing means 107 may be a spring such as a coiled wave spring having a plurality of turns. The second biasing means 107 may be referred to as a pressure relief valve spring.

The first 103 and second 107 biasing means are different biasing means. That is, they are not the same, for example, spring. This enables the valve 100 to be biased by two separate and predetermined spring constants. The spring constant of the second biasing means 107 is generally greater than the spring constant of the first biasing means 103. This is as the first biasing means 103 needs generally only to urge the valve 100 closed in the direction of fluid flow and therefore is assisted in its closing by the pressure of the fluid flow. The second biasing means 107, as it acts in the opposite direction, must resist the pressure of the fluid.

The first portion 205 of the valve seat 204 may have a cylindrical wall profile. It may be substantially flat, and have a substantially constant diameter. The second portion 206 of the valve seat 204 may comprise a tapered region 209, proximal the first portion 205 of the valve seat, which has a tapered wall profile, increasing the internal diameter of the second portion 206 relative the first portion 205. The profile of the tapered region 209 is thus a frustum having a circular base. The tapered region 209 may be considered a shoulder. The tapered region 209 allows better sealing of the valve 100 after the pressure in the coupling 2 has dropped below the surge pressure level. The second portion 206 may comprise a cylindrical region 210, having a cylindrical wall profile. The cylindrical region 210 may not be tapered. The internal diameter of the cylindrical region 210 is dimensioned such that the valve head 102, and/or any gasket or O-ring 105 provided at the valve head 102, does not fluidically seal against the cylindrical region 210 of the second portion 206.

The valve head 102 may comprise a projection 110 for engaging with a portion of the adapter 3. The valve head 102 may be provided with a tapered portion connecting an outer radial portion of the valve head to the projection 110. This tapered portion improves fluid flow properties. The projection 110 may extend from the centre of valve head 102 in the direction of the adapter end 203 of the coupling 2. The projection 110 may engage with a similar projection provided on a valve in the adapter 3.

The coupling 2 may comprise a support 211 extending from the body 200 to the internal bore of the coupling 2 provided with an aperture 214 for receiving the stem 101 of the valve 100. The support 211 may be fixed rigidly and be not moveable during operation with respect to the body 200. The first biasing means 103 may be provided on the adapter side of the support, that is, the side proximal to the adapter 3 during use. The support 211 may act as an abutment for the first biasing means 103. The second biasing means 107 may be provided on the tube side of the support, that is, the side distal the adapter 3 during use. The support 211 may act as an abutment for the second biasing means 107. A collar 212 provided with an annular slot 213 may be provided around the valve stem 201 and in connection to the support 211. The first biasing means 103 may be received in the annular slot 213 in the collar 212.

The coupling 2 may comprise a first portion 205 that has a length allowing the main flow valve 100 to be biased within the first portion 205 for a distance D before releasing a volume of fluid. This would be advantageous, as the distance D would allow the volume inside the coupling 2 to increase if the pressure increases, thereby relieving a small surge pressure without any leakage occurring and thereby absorbing pressure. If the pressure increases even more a small volume of fluid will be released but, in such embodiment, only until the pressure dropped under the point wherein the main flow valve is biased back into the first portion 205. The perimeter of the head 102 of the valve 100 is in contact with the first portion 205 throughout the length of the distance D. The distance D may be several times as long as the length of the second portion 206. The distance D can for example be between 2 cm and 8 cm. The volume created through moving the valve the distance D absorbs the pressure through increasing the volume inside the coupling 2.

The surge pressure threshold is pre-determined by the second biasing means 107. The surge pressure threshold may depend on the coupling 2 size, the expected working pressure of the assembly 1, the pump specifications, the weight of the fluid that currently is in transfer in the fluid transfer system but has not yet passed the coupling 2, the flow speed etc. A typical fluid transfer system as described herein could for example designed for a pressure class of 16, 25, or 40 bar. The burst pressure of such as system is at least five times the working pressure, i.e., for example at least 80, 125, or 200 bar. The surge pressure threshold may for example be between 16 to 200 bar, 40 to 200 bar, 25 to 125 bar, 16 to 80 bar, or any other suitable threshold.

A method for relieving surge pressure in a break-away valve assembly 1 will now be discussed. The assembly 1 comprises a coupling 2 as described herein. The method comprises braking-away or disconnecting the coupling 2 from the adapter 3, the valve 100 subsequently seals on the valve seat 204 of the coupling 2, therein, the flow of fluid is stopped. If the pressure acting on the valve 100 of the coupling 2 exceeds a predetermined limit the method further comprises allowing a small volume of fluid to flow past the valve 100, therein re-closing the valve 100 against the valve seat 204. The valve 100 may be re-closed by the second biasing means 107 described above.

The method for relieving surge pressure, wherein the predetermined limit comprises a predetermined sub limit, wherein if the pressure acting on the valve of the coupling 2 exceeds the predetermined sub limit, increasing the volume inside said coupling 2 through actuating said valve 100, wherein the predetermined sub limit is a lower pressure limit than the predetermined limit.

The term coupling 2 as used herein refers to a valve assembly for controlling fluid flow which is generally connectable to a pump system. A coupling 2 may be used in a break-away coupling assembly in which two separate valve assemblies are disconnectable from each other and thereupon the flow of fluid through the two valve assemblies is restricted by internal valve closing systems. The pressure relief valve as described herein may be suitable for use in a non-pumping side valve assembly, such as an adapter.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A coupling for a break-away valve assembly, said coupling comprising:
    an annular body, the annular body having a first end, a second end, a valve seat comprising a first portion and a second portion, the second portion being adjacent to the first portion and having an internal diameter larger than an internal diameter of the first portion, a main flow valve arranged in the annular body, the main flow valve being biased in a first direction toward the first end to seal against the valve seat on disconnection of the coupling from an adapter,
wherein the main flow valve is biased in a second direction toward the second end,
wherein the main flow valve is adapted to extend past the first portion into the second portion of the valve seat to release a volume of fluid if the pressure acting on the main flow valve exceeds a predetermined surge pressure threshold,
wherein the main flow valve has a valve head, a perimeter of the valve head having a sealing surface, and
wherein the sealing surface of the valve head contacts the first portion of the valve seat in a first position and moves in the first direction to a second position in the second portion of the valve seat to release the volume of fluid, the sealing surface of the valve head spaced from the second portion of the valve seat in the second position.

2. The coupling according to claim 1, wherein the main flow valve-comprises a valve head and valve stem.

3. The coupling according to claim 2, wherein the coupling comprises a first spring arranged around the stem of the valve.

4. The coupling according to claim 3, wherein the coupling comprises a second a spring arranged around the stem of the valve.

5. The coupling according to claim 4, wherein the first spring urges the valve towards the first end of the annular body, and wherein the second spring urges the valve towards the second end of the annular body.

6. The coupling according to claim 4, wherein the first and the second springs are different springs.

7. The coupling according to claim 5, wherein the first and the second springs are different springs.

8. The coupling according to claim 2, adapted such that fluid flow occurs via a space between the valve and the internal wall of the second portion of the of the valve seat.

9. The coupling according to claim 1, wherein the valve head of the main flow valve moves within the first portion along a distance, absorbing pressure without releasing a volume of fluid.

10. The coupling according to claim 9, wherein the distance is between 2 cm and 8 cm.

11. The coupling according to claim 1, wherein fluid flow occurs via a space between the valve and an internal wall of the second portion of the of the valve seat.

12. The coupling according to claim 1, wherein the main flow valve seals at the first portion of the valve seat.

13. A method for relieving surge pressure in a break-away valve assembly comprising the coupling according to claim 1, said method comprising:
disengaging the coupling from the adapter, the main flow valve subsequently sealing on the valve seat of the coupling, stopping flow of fluid, and, if the pressure acting on the valve of the coupling exceeds a predetermined limit, allowing a small volume of fluid to flow past the main flow valve; and
re-closing the main flow valve against the valve seat.

14. The method according to claim 13, wherein the predetermined limit comprises a predetermined sub limit, wherein if the pressure acting on the valve of the coupling exceeds the predetermined sub limit, increasing the volume inside said coupling through actuating said valve.

15. The coupling according to claim 1, wherein the main flow valve is biased in the first direction by a first spring extending between the body and a valve head of the main flow valve.

16. The coupling according to claim 15, wherein the main flow valve is biased in the second direction by a second spring extending between the body and a flange on an end of the main flow valve opposite the valve head.

17. The coupling according to claim 16, wherein the first spring and second spring are coil springs.

18. The coupling according to claim 1, wherein the annular body has a support fixed relative to the valve seat, and
wherein the first spring bears against a first surface of the support and the second spring bears against a second surface of the support, the second surface being opposite the first surface.

19. The coupling according to claim 1, wherein the valve seat is fixed relative to the annular body.

20. The coupling according to claim 1, further comprising a gasket on the perimeter of the valve head, the gasket forming the sealing surface.

* * * * *